United States Patent
Burton et al.

(10) Patent No.: US 6,954,824 B2
(45) Date of Patent: Oct. 11, 2005

(54) METHOD, SYSTEM, AND PROGRAM FOR DETERMINING A CONFIGURATION OF A LOGICAL ARRAY INCLUDING A PLURALITY OF STORAGE DEVICES

(75) Inventors: David Alan Burton, Vail, AZ (US); Robert Louis Morton, Tucson, AZ (US); Gary William Steffens, Tucson, AZ (US); Bryan John Wright, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 09/978,942

(22) Filed: Oct. 15, 2001

(65) Prior Publication Data

US 2003/0074527 A1 Apr. 17, 2003

(51) Int. Cl.⁷ ............................................. G06F 12/00
(52) U.S. Cl. ..................... 711/114; 711/112; 711/113; 711/147; 711/170
(58) Field of Search ................. 711/112–114, 170–173; 714/6

(56) References Cited

U.S. PATENT DOCUMENTS

| | | | | |
|---|---|---|---|---|
| 5,128,810 A | * | 7/1992 | Halford | 360/39 |
| 5,235,601 A | * | 8/1993 | Stallmo et al. | 714/766 |
| 5,258,984 A | * | 11/1993 | Menon et al. | 714/7 |
| 5,265,098 A | * | 11/1993 | Mattson et al. | 714/6 |
| 5,390,327 A | * | 2/1995 | Lubbers et al. | 714/7 |
| 5,524,204 A | * | 6/1996 | Verdoorn, Jr. | 714/6 |
| 5,568,629 A | * | 10/1996 | Gentry et al. | 711/114 |
| 5,572,699 A | | 11/1996 | Kamo et al. | 711/114 |
| 5,857,112 A | | 1/1999 | Hashemi et al. | 710/8 |
| 5,875,456 A | | 2/1999 | Stallmo et al. | 711/114 |
| 6,098,119 A | | 8/2000 | Surugucchi et al. | 710/10 |
| 6,145,067 A | | 11/2000 | Kuwata | 711/165 |
| 6,154,854 A | | 11/2000 | Stallmo | 714/6 |

OTHER PUBLICATIONS

IBM, Corp. "Information Brief *IntelliStation RAID Technology*" online, 1998, pp. 1–6. [Retrieved on Sep. 9, 2001]. Retrieved from the Internet at URL: <http://www.pc.ibm.com/us/infobrf/raidfin.html>.

IBM, Corp. "IBM Netfinity RAID Technology *Reliability through RAID technology*", 1999, pp. 1–15.

Mylex Corp. "AcceleRAID Installation Guide", Port No. 775007–00, 1998, pp. v to G–18.

* cited by examiner

*Primary Examiner*—T. Nguyen
(74) *Attorney, Agent, or Firm*—David W. Victor; Konrad Raynes & Victor LLP (57) ABSTRACT

Provided is a method, system, and program for determining a configuration of a logical array including a plurality of storage devices. A selection of a number of storage devices is received to include in the logical array. A determination is made of a number of groups in which to include the selected number of storage devices, wherein each group includes at least one storage device maintaining user data and parity data for the user data in the group. Determining an assignment of the selected number of storage devices to the determined number of groups and allocating the storage devices to the determined number of groups according to the determined assignment.

51 Claims, 5 Drawing Sheets

METHOD, SYSTEM, AND PROGRAM FOR DETERMINING A CONFIGURATION OF A LOGICAL ARRAY INCLUDING A PLURALITY OF STORAGE DEVICES

BACKGROUND OF THE INVENTION

1. Field of the Invention

The present invention relates to a system, method, and program for determining a configuration of a logical array including a plurality of storage devices.

2. Description of the Related Art

In a Redundant Array of Independent Disks (RAID Array) disk storage system, a data set is stored across a plurality of disks. In certain RAID implementations, parity data for the data striped across a set of disks is generated and stored for use in data recovery if necessary. In the current art, a user may access a graphical user interface (GUI) RAID configuration tool to create a logical RAID array forming a RAID rank, also known as a span. A span is a group of disks on which a data set is striped across and parity data maintained for the data sets in the span group. For RAID 3 or 5, a span must have at least three hard disk drives, whereas a RAID 1 span requires a minimum of two hard disk drives. Data or parity written to each disk in a RAID span is referred to as a stripe, where a stripe comprises the consecutive sectors written to a single disk in the span. A stride is the collection of all the stripes written to all the hard disk drives in the span. Many systems limit the number of hard disk drives that can be assigned to a single span, such as eight or sixteen. If the user wants to use more than the maximum number of disks that can be assigned to a single span, then the user must define multiple logical arrays or spans to provide for more disks.

There is a need in the art for improved techniques for allowing users to define a logical array, presenting a single logical storage space to the user.

SUMMARY OF THE PREFERRED EMBODIMENTS

Provided is a method, system, and program for determining a configuration of a logical array including a plurality of storage devices. A selection of a number of storage devices is received to include in the logical array. A determination is made of a number of groups in which to include the selected number of storage devices, wherein each group includes at least one storage device maintaining user data and parity data for the user data in the group. A determination is made of an assignment of the selected number of storage devices to the determined number of groups and allocating the storage devices to the determined number of groups according to the determined assignment.

In further implementations, each group comprises a Redundant Array of Independent Disk (RAID) rank.

In still further implementations, the determination of the number of groups is made to provide for a same number of storage devices assigned to each of the determined number of groups.

Still further, determining the number of groups may further comprise determining a plurality of number of groups that are a factor of the selected number of storage devices and selecting one of the determined plurality of number of groups as the determined number of groups. In still further implementations, selecting one of the determined plurality of number of groups comprises selecting a one of the plurality of the number of groups, such that the selected number of storage devices divided by the selected number of groups is greater than or equal to a predetermined number of disks.

Described implementations provide a technique to allow multiple groups or spans (ranks) to be assigned to a logical array, where each span includes user data and parity information for that data. This technique allows more than the maximum number of disks allowed for one rank to be assigned to a logical array. Further, the described implementations provide techniques for assigning disk to the spans in a manner that may consider one or more factors, such as the availability of span resources, maximizing the ratio of user data to parity in a span, improving cache utilization, balancing the assignment of disks to spans, etc.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
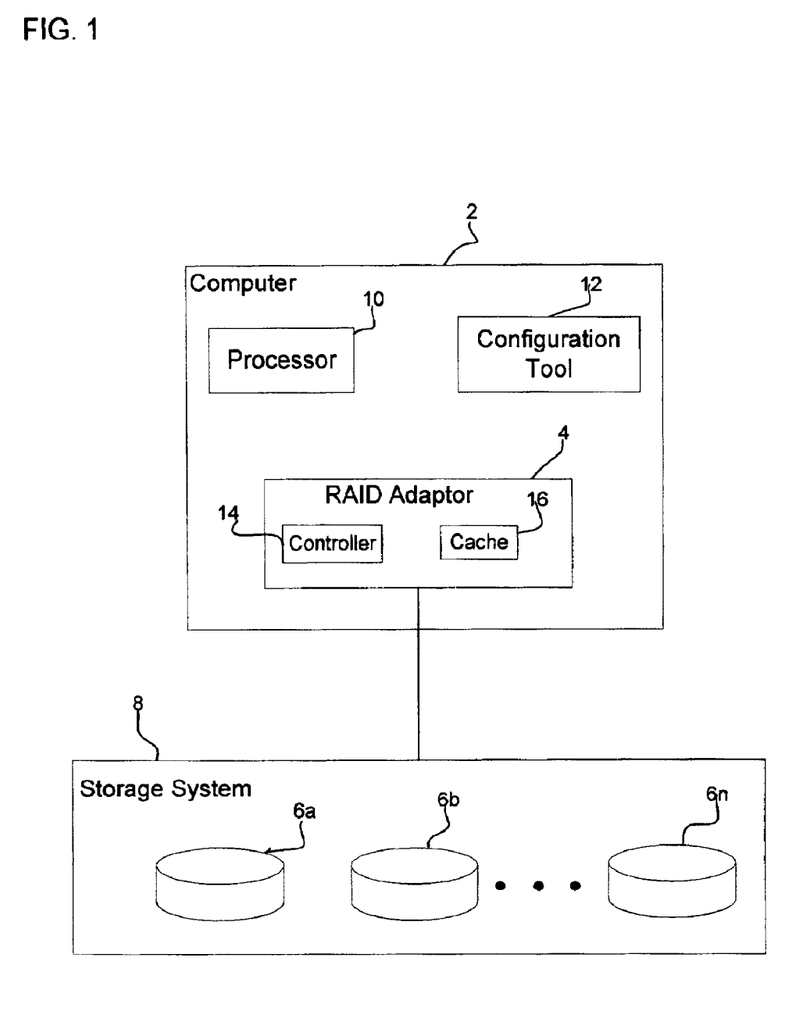
FIG. 1 illustrates a computing environment in which aspects of the invention are implemented.

FIG. 1 illustrates a computing environment in which aspects of the invention are implemented. A computer system 2 includes a RAID adaptor 4 to manage a plurality of hard disk drives 6a, b . . . n in a storage system 8 as one or more RAID arrays. The computer system 2 further includes a processor 10 and configuration tool 12 software executed by the processor 10. The configuration tool 12 presents a graphical user interface (GUI) to the user via a monitor (not shown) to allow the user to assign hard disk drives 6a, b . . . n in the storage system 8 to a logical array. In alternative implementations, the user interface implemented by the configuration tool 12 may comprise a command line interface, or interface other than a GUI. In response to the user input, the configuration tool 12 may determine an optimal configuration of hard disk drives 6a, b . . . n to spans in a new logical array. The computer system 2 may comprise any computing device known in the art, such as a mainframe, server, storage controller, workstation, personal computer, laptop computer, etc., or any other system capable of including and operating a RAID adaptor 4 to manage RAID arrays. The configuration tool 12 would drive the RAID adaptor 4 to perform RAID configuration and management operations to implement a user request to configure a logical array having a user specified size or number of disk drives.

The RAID adaptor 4 includes a RAID controller 14 that is capable of configuring the disk drives 6a, b . . . n into RAID arrays and striping data to the arrays in a manner known in the art. The RAID adaptor 4 further includes a RAID cache 16 where data is cached before the RAID controller 14 writes the data out to the disks 6a, b . . . n or returns data read from the disks 6a, b . . . n.

The RAID adaptor 4 may comprise a card, such as a Peripheral Component Interface (PCI) card, inserted in an expansion slot of the computer system 2 or implemented directly on the motherboard or other section of the computer system 2. Alternatively, the components of the RAID adaptor 4, including the RAID controller 14 and cache 16, may be implemented in an external system to the computer 2, such as a storage subsystem. The storage system 8 including the disks 6a, b . . . n that may be selected to add to a configuration may comprise a single enclosure comprising a plurality of disk drives, multiple enclosures each including a plurality of disk drives, and a distributed storage system comprised of multiple enclosures of disk drives, e.g., disks, tape cassettes, etc., distributed over a network. In still further implementations, the RAID controller 14 may be implemented as software executed by the processor 10 and the RAID cache 16 would be implemented in the computer 2 cache memory (not shown) used by the processor 10. In yet further implementations, the RAID controller 14 and cache 16 may be implemented in an enclosure including the disk drives 6a, b . . . n that are configured as RAID arrays.

Figure 2:
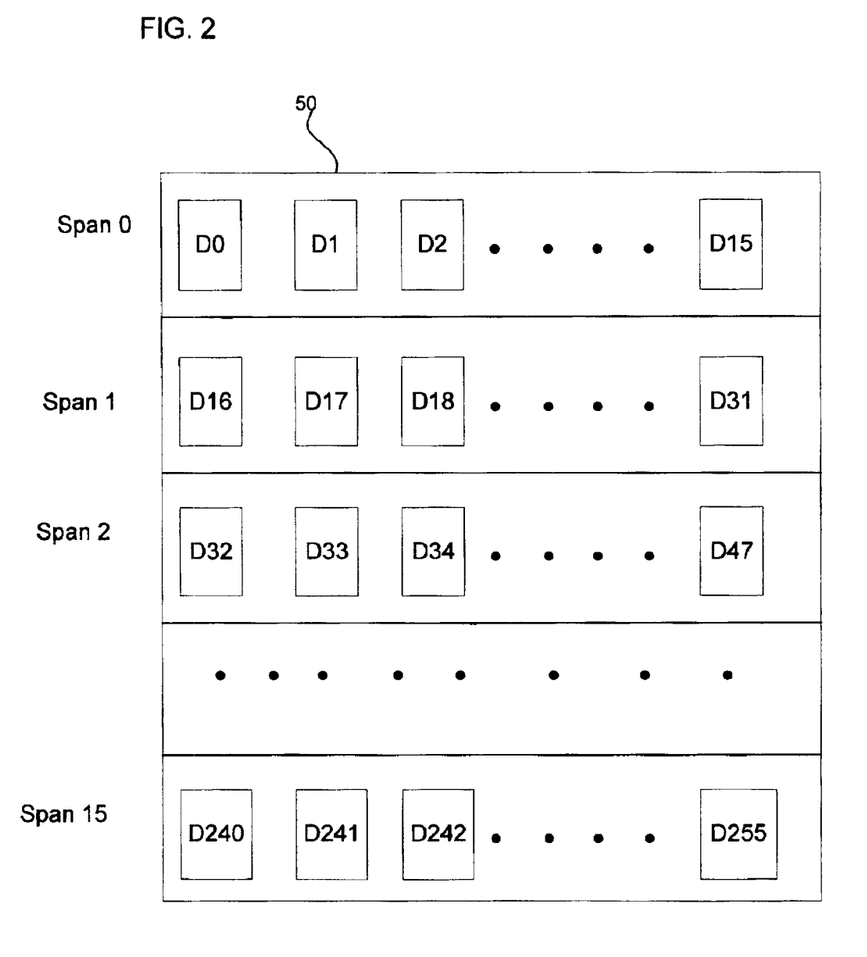
FIG. 2 illustrates an example of how spans may be allocated to a logical array in accordance with implementations of the invention.

FIG. 2 illustrates a logical array 50 defined by a user using the configuration tool. The logical array 50 is comprised of a plurality of spans 0, 1, 2 . . . 15. Each span 0, 1, 2 . . . 15 is defined to include one or more hard disk drives (D), which in the example of FIG. 2 is sixteen drives per span.

As discussed, the user utilizes the configuration tool 12 through a graphical user interface or other input mechanism, to select a number of drives to assign to a logical array. The configuration tool 12, in response to receiving a user selection of hard disk drives 6a, b . . . n to assign to a logical array, would then assign the disks to one or more spans to implement the logical RAID array. The stripes written to the disks in the span include both parity and data. In certain implementations, within a span, one disk may be dedicated to parity stripes and the other disks to data stipes. Alternatively, the parity and data may be interleaved throughout stripes on the disks of the span.

In determining the allocation of user selected hard disk drives 6a, b . . . n to spans, the following factors may be considered and balanced: providing an equal number of disk drives in each span; minimizing the number of spans, i.e., maximize the number of disks assigned to each span; assigning enough hard disk drives 6a, b . . . n to a span to implement a requested RAID configuration; minimizing the percentage of disk space used for parity data; and selecting a span width, i.e., where width indicates the number of disks 6a, b . . . n assigned to the span, that does not overburden the RAID cache 16.

In configuring the array, one objective is to have the controller 14 assign an equal number of disk drives 6a, b . . . n to each span to provide equal data storage space in each span. For instance, if a first span has fewer hard disk drives than a second span, where each have the same number of disk drives devoted to parity data, then the second span has a larger data storage space than the first span. Providing equal storage regions for each span helps accomplish the goal of maintaining the ratio of space in the span devoted to parity as low as possible across all spans.

Another objective is to minimize the number of spans used because there are a limited number of span resources available for use by the RAID adaptor 4. This requires that the maximum allowable number of disks be allocated to each span. It is also desirable to maximize the number of disk drives assigned to a span in order to maximize the amount of space in the span that can be used by data and minimize the amount of space devoted to parity. For instance, if a span has four disks, then one disk is devoted to parity and the other three to data, i.e., 25% of the space is used for parity, whereas if a span has 10 disks, then only 10% of the span space is dedicated to parity, thus maximizing the amount of space in the array that can be used for data. Minimizing the amount of space in the span devoted to parity optimizes the amount of user data space in the span. Thus, maximizing the number of disks assigned to each span satisfies two configuration goals, minimizing span resources and maximizing the amount of space in each span available for user data.

The objective to minimize span resources and maximize available user data storage space by maximizing the number of disks 6a, b . . . n assigned to a span must be balanced with the competing goal of cache utilization. To improve cache utilization performance, it is desirable to allow for many stripes and strides including modified data and read data to be maintained in cache 16. The greater the stripe size, which comprises the amount of data in a stripe, and the more disks assigned to the span, then the fewer stripes and strides may be maintained in cache 16. For instance, performance is optimized by having the RAID controller 14 buffer the data for an entire stride before writing the stripes for the stride to the disks 6a, b . . . n because the RAID controller 14 need only calculate parity once for the entire stripe and then sequentially write at once the parity and data for the stripe to the hard disk drives 6a, b . . . n assigned to the span. Performance is further improved because when writing out an entire stripe unit, the controller 14 can write the stripe data sequentially to the disks 6a, b . . . n in a span, which has improved performance over random or non-sequential writes. It is also desirable to cache an entire stripe read from the span into cache 16 in order to improve read performance by allowing for sequential read access. Still further, the likelihood of cache hits increases as data for more stripes and strides is maintained in cache 16.

Optimizing certain goals by increasing the number of disks in a span harms the goal of optimizing cache utilization. Thus, the configuration tool 12 must balance the goals of maximizing the number of disks 6a, b . . . n assigned to a span and the span size with the goal of optimizing RAID cache 16 utilization by maximizing the number of stripes and strides that may be stored in cache 16. The user may specify the stripe size. In such case optimization would be based on the user configured stripe size.

One other requirement in configuring a logical array is to ensure that enough disks are assigned to each span to implement the user requested RAID level. For instance, a RAID level 1 configuration requires at least two disks drives 6a, b . . . n and RAID levels 3 and 5 require at least three disk drives 6a, b . . . n. Thus, the configuration tool 12 must ensure that the minimum number of drives are assigned to each span to implement the user requested RAID level.

In certain implementations, the configuration tool 12 may consider the following variables in determining how to allocate a user selected number of disk drives 6a, b . . . n to spans (ranks):

numDisks: a number of disks used in each span. This number may be set to a predetermined optimal number of disks per span based on performance testing that balances the goals of increasing the ratio of data to parity and conserving span resources, which requires maximizing the number of disks per span, against the goal of improving cache utilization, which seeks to minimize the number of disks per span. The initial numDisks would also include at least the number of disks needed to implement the user selected RAID level.

selected_numDisks: the number of disks the user selected to add to a logical array.

max_numDisks: this variable may be set to either the maximum number of disks allowed in a single span based on the RAID controller 14 capabilities. For instance, in certain RAID controllers 14 configure no more than sixteen disks in a span.

max_numSpans: the maximum number of spans that may be assigned to an array based on the RAID controller 14 capabilities. For instance, certain RAID controllers may only allow sixteen spans per array at most.

min_numSpans: the minimum number of spans that are required to implement the logical array including all the disk drives 6a, b . . . n selected by the user. The min_numSpans is the result of dividing the selected_numDisks by the max_numDisks (the maximum number of disks allowed per span). If the division result is not an integer, then rounding the result upward to the next whole number.

numSpansList: a list of a number of spans that can be used and provide for a balance of the allocation of the selected disks (selected_numDisks) to spans.

availableSpans: the number of span resources that may be used in future logical arrays, i.e., unused spans. This value is dependent on the capabilities of the RAID controller 14.

addSpanThreshold: a threshold integer number of spans that may be added to a logical array to allow for disk balancing. This value may be set lower to conserve span resources or higher if the user is less concerned with conserving span resources, such as the case if the user intends to only configure a limited number of logical arrays with the controller 14.

Figure 3:
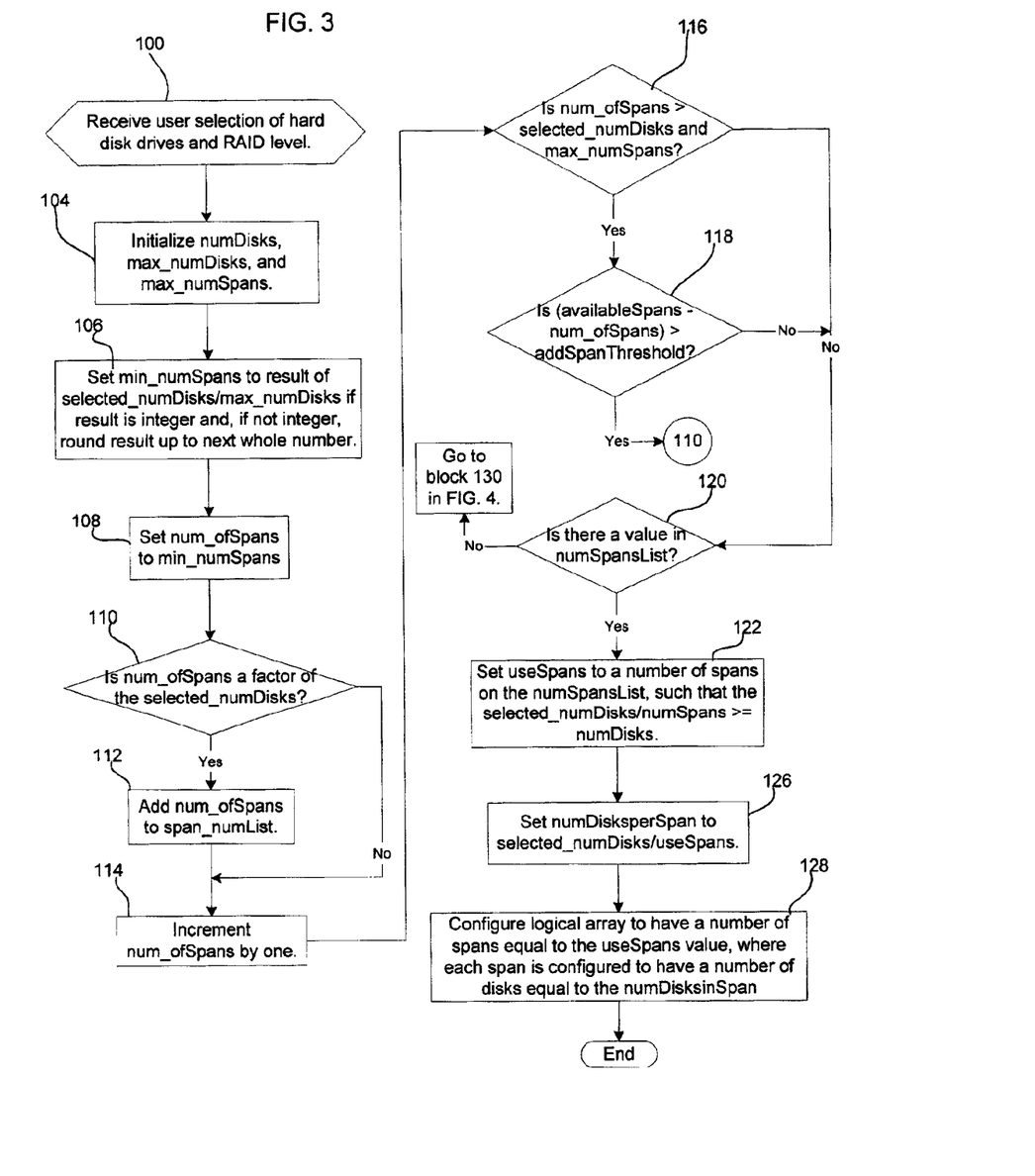
FIGS. 3 and 4 illustrates logic to configure a logical array to include multiple spans in accordance with implementations of the invention.
Figure 4:
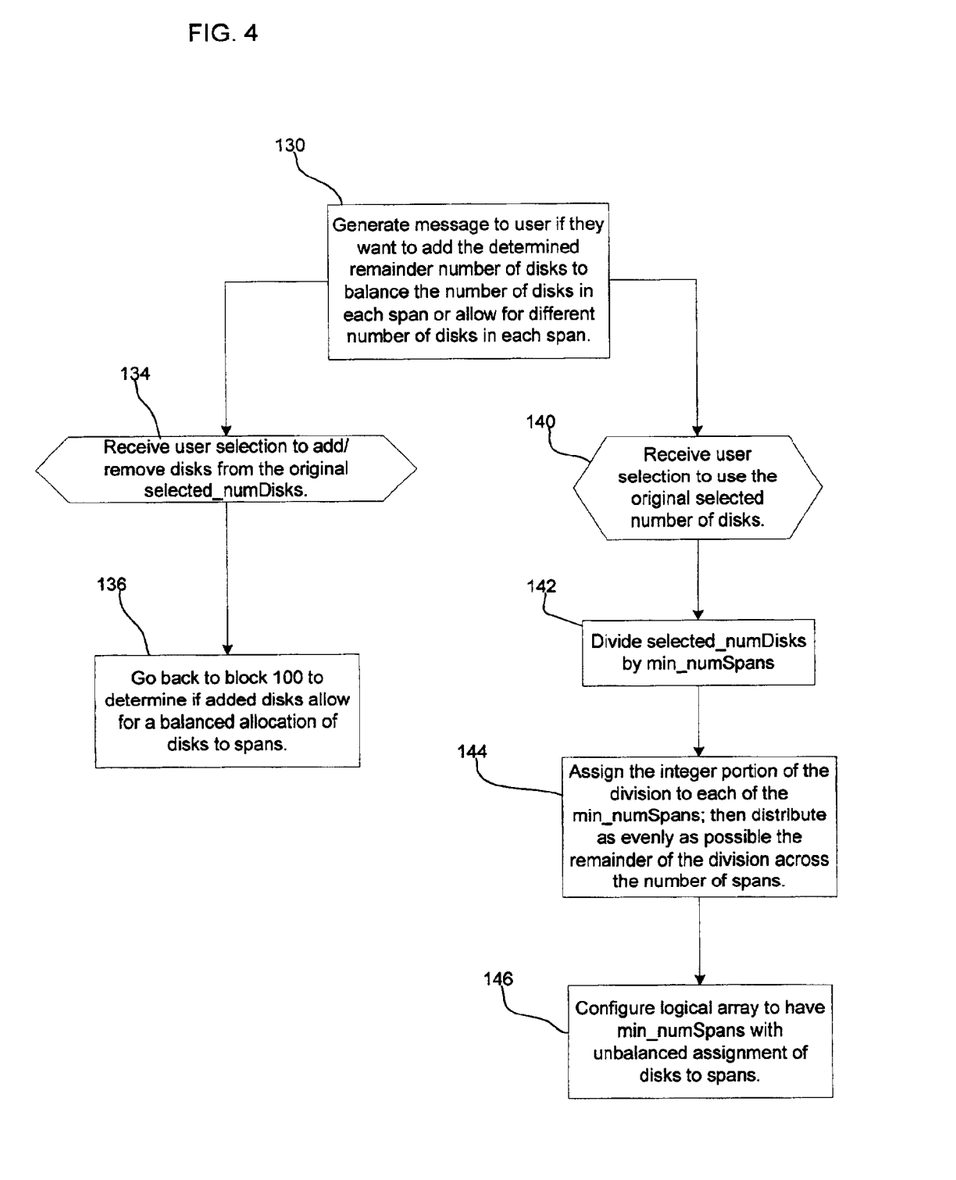

FIGS. 3 and 4 illustrate logic implemented in the configuration tool 12 program that is executed by the processor 10 to utilize the above variables to select an allocation of user selected disk drives 6a, b . . . n to spans to use in configuring a logical array for the user that balances the competing goals of increasing the disk/parity ratio in a span, conserving span resources, and improving cache utilization. Control begins at block 100 upon receiving a user selection of hard disk drives 6a, b . . . n and a RAID level to use in configuring a logical array. The configuration tool 12 initializes (at block 104) the numDisks and max_numDisks. As mentioned, the numDisks may comprise an optimal number of disks capable of implementing the selected RAID level that has been found to optimize the competing goals that seek to minimize and maximize the number of disks in a span. The max_numDisks may be initialized to the maximum number that the RAID controller 14 can assign to one span. The configuration tool 12 then sets (at block 106) the min_numSpans to the result of the selected number of disks (selected_numDisks) divided by the initial number of disks (numDisks) if the result is an integer, and if the result is not an integer the initial number of disks (numDisks) is set to the result rounded up to the next whole number. The num_ofSpans is set (at block 108) to the determined minimum number of spans (min_numSpans) needed. If (at block 110) the num_ofSpans is a factor of the user selected number of disks (selected_numDisks), i.e., the result of dividing the selected_numDisks by the num_ofSpans is an integer, then the number of spans variable (num_ofSpans) is added (at block 112) to the list of span number (numSpansList) that can be used to provide a balance of the assignment of the user selected number of disks (selected_numDisks) to spans in the array to configure.

From block 110 or 112, control proceeds to block 114 where the number of spans variable (num_ofSpans) is incremented by one. If (at block 116) the number of spans variable (num_ofSpans) exceeds both the selected number of disks (selected_numDisks) and the maximum number of spans (max_numSpans) that can be assigned to an array, then that number of spans cannot be used in the current configuration. If the number of spans can be used, i.e., the num_ofSpans is less than both the selected_numDisks and the max_numSpans, and if (at block 118), the number of spans left after using the number of spans (num_ofspans) in the configuration, i.e., the availableSpans minus the num_ofSpans, is greater than the span threshold (addSpanThreshold), then that number of spans indicated in the num_ofSpans variable can be used without causing the available span resources to fall below a predetermined threshold (addSpanThreshold). In such case, control proceeds to block 110 to add that acceptable number of spans (num_ofSpans) to the list of span numbers (numSpansList) that can provide a balanced assignment of disks if the number of spans (num_ofSpans) is a factor of the user selected number of disks (selected_numDisks). The number of spans variable (num_ofSpans) is incremented and further number of spans are considered until the number of spans variable (num_ofSpans) exceeds the selected number of disks (selected_numDisks) or the maximum number of disks that may be assigned to a span (max_numSpans) or would cause the available span resources to fall below a predetermined threshold (addSpanThreshold).

After considering all possible number of spans from the no branches of block 116 or 118, control proceeds to block 120 to select a number of spans to use in the configuration. A determination is made (at block 120) as to whether the list of span numbers is non-empty, i.e., there is one acceptable number of spans that will provide an equal distribution of disks to spans. If so, then a number of spans is selected from the list (numSpansList), such that the selected number of spans (useSpans) is selected such that the selected_numDisks divided by the number of spans to use (useSpans) is greater than or equal to the numDisks set at block 104. In certain implementations, the minimum number of spans (useSpans) that satisfies the test in block 122 is selected in order to minimize use of span resources and maximize number of disks in the spans. The number of disks to include in each span (numDisksperSpa) is set (at block 126) to the user selected number of disks (selected_numDisks) divided by the number of spans to use (useSpans). Alternatively, a maximum or greater number of spans may be selected from the list to satisfy the condition in block 122 in order to reduce the number of disks per span to improve cache utilization. Control then proceeds to block 128 to configure the logical array with the determined number of spans (useSpans) and the determined number of disks to use in each span (numDisksperSpan).

If (at block 120) the list of span numbers (numSpansList) is empty, i.e., there is no acceptable number of spans that can be used to provide a balanced assignment of the user selected number of disks without using more than the allowable number of spans (as determined at block 116) or depleting span resources to a predetermined low threshold levels (as determined at block 118), then control proceeds to block 130 in FIG. 4. At block 130, the configuration tool 12 generates a message to the user providing the user a choice to select to add or remove disks to the logical array to provide allow for an equal number of disks to be assigned to spans or to select to provide an unequal distribution of the disks to the spans. If (at block 134) the user elected to add or remove disks to the logical array to provide a balanced assignment of disks to spans, then control would proceed back to block 100 in FIG. 3 to determine whether a balanced distribution of disks to spans can be accomplished.

Figure 5:
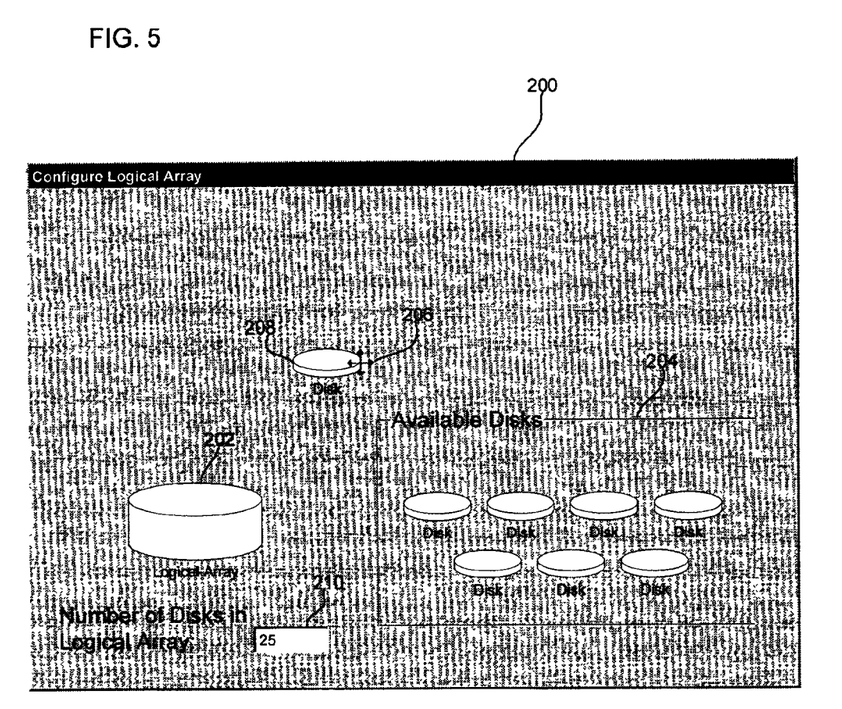
FIG. 5 illustrates a graphical user interface (GUI) used to allow a user to assign storage devices to a logical array in accordance with implementations of the invention.

In certain implementations, the configuration tool 12 may implement a graphical user interface (GUI) indicating whether the logical array is balanced. FIG. 5 illustrates a GUI configuration panel 200 including a logical array icon 202 representing a logical array being created by the user of the GUI panel 200 and an available disk section 204 including disk icons representing disk drives 6a, b . . . n available to be assigned to a logical array, i.e., are not already assigned to a logical array. The user may control a pointer 206 using an input device known in the art to graphically drag-and-drop one of the displayed disk icons 208 from the available disks section 204 to the logical array icon 202 to add a particular logical disk to the logical array represented by the logical array icon 202. A field 210 may display a current number of disk that have are currently assigned to the logical array 202. In one implementation, if the number of currently selected disks cannot be assigned to spans without avoiding span resource conservation from the no branches at blocks 116 and 122, then the configuration tool 12 may display the logical array icon 202 in a particular color, e.g., red, to indicate that the current number of selected disks (selected_numDisks) cannot be evenly balanced among a number of spans. The user may then drag and drop disk icons from the available disk section 204 to add a disk (at block 134 in FIG. 4) to the logical array and again perform (at block 136 in FIG. 4) the logic of FIG. 3 beginning at block 100. If the selected disks can be equally balanced among spans as determined at block 120, then the logical array icon 202 may be displayed in a color, e.g., green, indicating that disks can be evenly distributed among spans. Otherwise, the logical array icon 202 remains displayed in a color indicating imbalance.

Further, the user may use the GUI to obtain information on the consequences of adding more disks to the logical array or having an unbalanced logical array to make a more appropriate decision of whether to add disks or proceed with an unbalanced distribution of disks to spans.

With respect to FIG. 4, if (at block 140) the user selects to have an unequal distribution of disks to spans in the logical array being configured, then the configuration tool 12 proceeds to block 142 to implement an unequal distribution. At block 142, the configuration tool 12 divides the user selected number of disks (selected_numDisks) by the minimum number of spans that may be used (min_numSpans) and assigns (at block 144) the integer portion of the division operation to each of the minimum number of spans that can be used (min_numSpans). The remainder number of disks is then distributed as evenly as possible across the minimum number of spans. The configuration tool 12 then configures (at block 146) the logical array to have the minimum number spans (min_numSpans) with the unbalanced assignment of disks to spans. In certain implementations, to perform the configuration at blocks 128 or 146, the configuration tool 12 would provide the configuration information to the RAID controller 14, which in turn would perform the configuration operations on the disks 6a, b . . . n in the storage device 4.

The described implementations allow users to define logical arrays that include multiple spans (ranks), thereby allowing more than the maximum allowable number of disks per span to be assigned to a logical array. Further, with the described implementations, the configuration tool 12 implements a series of rules to determine how to allocate the user selected number of disks to the multiple spans (ranks). As discussed, the configuration tool 12 may consider the availability of span resources, the goal to have a maximum number of disks in a span to maximize the data-to-parity ratio, yet not include too many disks in a span to prevent the RAID cache 16 from buffering an entire stripe unit, etc. In certain implementations, the configuration tool 12 may determine a number of spans to use without requiring user involvement or knowledge

ADDITIONAL IMPLEMENTATION DETAILS

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The described logic considered various variables when determining the allocation of disks to spans (ranks). In alternative implementations, the configuration tool 12 may not consider all of the factors. For instance, the configuration tool 12 may ignore the RAID cache 16 limitations, and set the max_numDisks to the maximum number of disks that may be allocated to a span. Alternatively, the configuration tool 12 may evenly distribute disks to the minimum number of possible spans without concern for conserving span resources. Still further, the user may adjust the configuration by adjusting certain of the thresholds, e.g., the addSpanThreshold and spanThreshold, used at blocks 116 and 122, respectively. Yet further, the configuration tool 12 may automatically implement unbalanced logical arrays without prompting the user at block 130, i.e., where the disks are not evenly distributed to spans and the minimum number of spans possible is used. Thus, the configuration tool 12 may use any number of the above described considerations when determining how to allocate disks to spans. Moreover, additional factors not mentioned herein may also be considered when determining how to allocate disks to spans.

The preferred logic of FIGS. 3–4 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

In the described implementations, the configuration tool 12 was used to allocate disks to a logical array in a RAID storage device. Additionally, the above described configuration operations can be used to configure non-RAID storage devices. In such case, the logical array would be implemented using storage technology other than RAID, such that the logical array allows a plurality of different storage devices, e.g., disks, tapes, etc., appear as a single storage space to the user. For instance, in the described implementations, disks were assigned to RAID spans or ranks. The term "spans" may describe any group of configured disks that provide both user data and complete parity for such user data, such as the case with a RAID rank. In the described implementations, the logical array is comprised of multiple spans, or multiple groups of disks.

In the described implementations, the disk drives 8a, b, c, d, e comprised magnetic hard disk drives. In alternative implementations, the storage device 4 may comprise any storage device known in the art, such as optical disks, tapes, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computerized method for determining configuration of a logical array including a plurality of storage devices, comprising:

receiving a selection of a number of storage devices to include in the logical array;

determining a group resource allocation variable used to accomplish a resource allocation goal of storage devices to groups;

using the determined group resource allocation variable to determine a number of groups in which to include the selected number of storage devices in a manner that accomplishes the resource allocation goal, wherein the determined number of groups does not exceed a maximum number of groups that may be used in a logical array, and wherein each group includes at least one storage device maintaining user data and parity data for the user data in the group;

determining an assignment of the selected number of storage devices to the determined number of groups; and allocating the storage devices to the determined number of groups according to the determined assignment.

2. The method of claim 1, wherein the parity data in each group is used only for the user data in that group.

3. The method of claim 2, wherein each group comprises a Redundant Array of Independent Disk (RAID) rank.

4. The method of claim 1, wherein the number of groups is determined so that a same number of storage devices may be assigned to each of the determined number of groups.

5. The method of claim 1, wherein determining the number of groups further comprises:

determining a plurality of number of groups that are a factor of the selected number of storage devices; and selecting one of the determined plurality of number of groups, wherein the determined number of groups comprises the selected number of groups.

6. The method of claim 5, wherein selecting one of the determined plurality of number of groups comprises selecting a one of the plurality of the number of groups, such that the selected number of storage devices divided by the selected number of groups is greater than or equal to a predetermined number of storage devices.

7. The method of claim 5, wherein the number of groups that may be assigned to logical arrays is limited, and wherein determining the plurality of number of groups further comprises for each factor of the selected number of groups:

determining whether using the factor as the number of groups in the logical array would cause a remaining number of available groups to fall below a threshold; and indicating the factor as one of the determined plurality number of groups if using the factor would not cause the remaining number of available groups to fall below the threshold.

8. The method of claim 7, wherein determining the plurality of number of groups further comprises for each factor of the selected number of groups:

determining whether using the factor as the number of groups in the logical array would exceed a maximum number of groups that may be used in the logical array, wherein the factor is indicated as one of the determined plurality number of groups if using the factor would not cause the remaining number of available groups to fall below the threshold.

9. The method of claim 1, wherein the determined assignment does not assign less than a minimum number of storage devices to each group.

10. The method of claim 9, wherein there are a maximum number of groups that may be used with logical arrays, wherein the minimum number of storage devices assigned to each group is determined based on balancing goals of optimizing cache utilization, conserving available groups, and maximizing an amount of space in each group available for user data.

11. The method of claim 1, further comprising:

receiving a selection of a configuration level requiring a minimum number of storage devices per group to implement the configuration level in each group, wherein assigning the storage devices to the determined number of groups allocates at least the minimum number of storage devices to each group.

12. The method of claim 11, wherein each group comprises a Redundant Array of Independent Disk (RAID) rank and wherein the configuration level comprises a level number of the rank.

13. The method of claim 1, wherein the group resource allocation variable comprises at least on variable that is member of the group of variables comprising:

a maximum number of storage devices used in a single group;

a maximum number of groups to which the selected number of storage devices may be assigned; and a minimum number of groups to which the selected number of storage devices may be assigned.

14. The method of claim 1, wherein the resource allocation goal is a member of a set of resource allocation goals comprising:
providing an equal number of storage devices in each group;
ensuring that the groups have a sufficient number of storage devices to implement a requested RAID configuration;
minimizing the number of groups; and
limiting the number of storage devices assigned to each group to improve cache utilization.

15. A method for determining a configuration of a logical array including a plurality of storage devices, comprising:
receiving a selection of a number of storage devices to include in the logical array;
determining a number of groups in which to include the selected number of storage device, wherein each group includes at least one storage device maintaining user data and parity data for the user data in the group, by:
(i) determining whether a number of groups can be selected to which the user selected number of storage devices can be equally allocated; and
(ii) providing information indicating that a same number of storage devices cannot be allocated to each group; and
determining an assignment of the selected number of storage devices to the determined number of groups; and
allocating the storage devices to the determined number of groups according to the determined assigmnent.

16. The method of claim 15, further comprising:
after providing the information, receiving input information on additional storage devices to add to the logical array; and
performing another iteration of determining the number of groups and the assignment in response to receiving the input information on the additional storage devices.

17. The method of claim 15, further comprising:
after providing the information, receiving input information indicating acceptance of an unbalanced assignment of storage devices to groups, wherein the determined assignment provides a different number of storage devices to at least two of the groups after receiving the input information indicating acceptance of the unbalanced allocation.

18. A system for determining a configuration of a logical array, comprising:
a plurality of storage devices;
means for receiving a selection of a number of storage devices to include in the logical array,
means for determining a group resource allocation variable used to accomplish a resource allocation goal of storage devices to groups;
means for using the determined group resource allocation variable to determine a number of groups in which to include the selected number of storage devices in a manner that accomplishes the resource allocation goal, wherein the determined number of groups does not exceed a maximum number of groups that may be used in a logical array, and wherein each group includes at least one storage device maintaining user data and purity data or the user data in the group;
means for determining an assignment of the selected number of storage devices to the determined number of groups; and
means for allocating the storage devices to the determined number of groups according to the determined assignment.

19. The system of claim 18, wherein the parity data in each group is used only for the user data in that group.

20. The system of claim 19, wherein each group comprises a Redundant Array of Independent Disk (RAID) rank.

21. The system of claim 18, wherein the number of group is determined so that a same number of storage devices may be assigned to each of the determining number of groups.

22. The system of claim 18, wherein the means for determining the number of groups further performs:
determining a plurality of number of groups that are a factor of the selected number of storage devices; and
selecting one of the determined plurality of number of groups, wherein the determined number of groups comprises the selected number of groups.

23. The system of claim 22, wherein the means for selecting one of the determined plurality of number of groups selects a one of the plurality of the number of groups, such that the selected number of storage devices divided by the selected number of groups is greater than or equal to a predetermined number of storage devices.

24. The system of claim 22, wherein the number of group that may be assigned to logical arrays is limited, and wherein the means for determining the plurality of number of groups performs for each factor of the selected number of groups:
determining whether using the factor as the number of groups in the logical array would cause a remaining number of available groups to fall below a threshold; and
indicating the factor as one of the determined plurality number of groups if using the factor would not cause the remaining number of available groups to fall below the threshold.

25. The system of claim 22, wherein the means for determining the plurality of number of groups performs for each factor of the selected number of groups:
determining whether using the factor as the number of groups in the logical array would exceed a maximum number of groups that may be used in the logical array, wherein the factor is indicated as one of the determined plurality number of groups if using the factor would not cause the remaining number of available groups to fall below the threshold.

26. The system of claim 18, wherein the determined assignment does not assign less then a minimum number of storage devices to each group.

27. The system of claim 26, wherein there are a maximum number of groups that may be used with logical arrays, wherein the minimum number of storage devices assigned to each group is determined based on balancing goals of optimizing cache utilization, conserving available groups, and maximizing an amount of space in each group available for user data.

28. The system of claim 18, further comprising:
means for receiving a selection of a configuration level requiring a minimum number of storage devices per group to implement the configuration level in each group, wherein assigning the storage devices to the determined number of groups allocates at least the minimum number of storage devices to each group.

29. The system of claim 28, wherein each group comprises a Redundant Array of Independent Disk (RAID) rank and wherein the configuration level comprises a level number of the rank.

30. The system of claim 18, wherein the group resource allocation variable comprises at least on variable that is member of the group of variables comprising:
   a maximum number of storage devices used in a single group;
   a maximum number of groups to which the selected number of storage devices maybe assigned; and
   a minimum number of groups to which the selected number of storage devices may be assigned.

31. The system of claim 18, wherein the resource allocation goal is a member of a set of resource allocation goals comprising:
   providing an equal number of storage devices in each group;
   ensuring that the groups have a sufficient number of storage devices to implement a requested RAID configuration;
   minimizing the number of groups; and
   limiting the number of storage devices assigned to each group to improve cache utilization.

32. A system for determining a configuration of a logical array, comprising:
   a plurality of storage devices;
   means for receiving a selection of a number of storage devices to include in the logical array;
   means for determining a number of groups in which to include the selected number of storage devices, wherein each group includes at least one storage device maintaining user data and parity data for the user data in the group, by:
      (i) determining whether a number of groups can be selected to which the user selected number of storage devices can be equally allocated; and
      (ii) providing information indicating that a same number of storage devices cannot be allocated to each group; and
   means for determining an assignment of the selected number of storage devices to the determined number of groups; and
   means for allocating the storage device to the determined number of groups according to the determined assignment.

33. The system of claim 32, further comprising:
   means for receiving input information on additional storage devices to add to the logical array after providing the information; and
   means for performing another iteration of determining the number of groups and the assignment in response to receiving the input information on the additional storage devices.

34. The system of claim 32, further comprising:
   means for receiving input information, after providing the information, indicating acceptance of an unbalanced assignment of storage devices to groups, wherein the determined assignment provides a different number of storage devices to at least two of the groups after receiving the input information indicating acceptance of the unbalanced allocation.

35. An article of manufacture include code for determining a configuration of a logical array including a plurality of storage devices, wherein the code is capable of causing operations comprising:
   receiving a selection of a number of storage devices to include in the logical array;
   determining a group resource allocation variable used to accomplish a resource allocation goal of storage devices to groups;
   using the determined group resource allocation variable to determine a number of groups in which to include the selected number of storage devices in a manner that accomplishes the resource allocation goal, wherein the determined number of groups does not exceed a maximum number of groups that may be used in a logical array, and wherein each group includes at least one storage device maintaining user data and parity data for the user data in the group;
   determining an assignment of the selected number of storage devices to the determined number of groups; and
   allocating the storage devices to the determined number of groups according to the determined assignment.

36. The article of manufacture of claim 35, wherein the parity data in each group is used only for the user data in that group.

37. The article of manufacture of claim 36, wherein each group comprises a Redundant Array of Independent Disk (RAID) rank.

38. The article of manufacture of claim 35, wherein then number of groups is determined so that a same number of storage devices may be assigned to each of the determined number of groups.

39. The article of manufacture of claim 35, wherein determining the number of groups farther comprises:
   determining a plurality of number of groups that are a factor of the selected number of storage devices; and
   selecting one of the determined plurality of number of groups, wherein the determined number of groups comprises the selected number of groups.

40. The article of manufacture of claim 39, wherein select one of the determined plurality of number of groups comprises selecting a one of the plurality of the number of groups, such that the selected number of storage devices divided by the select number of groups is greater than or equal to a predetermined number of storage devices.

41. The article of manufacture of claim 39, wherein the number of groups that may be assigned to logical arrays is limited, and wherein determining the plurality of number of groups further comprises for each factor of the selected number of groups:
   determining whether using the factor as the number of groups in the logical array would cause a remaining number of available groups to fall below a threshold; and
   indicating the factor as one of the determined plurality number of group if using the factor would not cause the remaining number of available groups to fall below the threshold.

42. The article of manufacture of claim 41, wherein determining the plurality of number of groups further comprises for each factor of the selected number of groups:
   determining whether using the factor as the number of groups in the logical array would exceed a maximum number of groups that may be used in the logical array, wherein the factor is indicated as one of the determined plurality number of groups if using the factor would not cause the remaining number of available groups to fall below the threshold.

43. The article of manufacture of claim 35, wherein the determined assignment does not assign less than a minimum number of storage devices to each group.

44. The article of manufacture of claim 43, wherein there a maximum number of groups that may be used with logical arrays, wherein the minimum number of storage devices assigned to each group is determined based on balancing goals of optimizing cache utilization, conserving available groups, and maximizing an amount of space in each group available for user data.

45. The article of manufacture of claim 35, further comprising:

receiving a selection of a configuration level requiring a minimum number of storage devices per group to implement the configuration level in each group, wherein assigning the storage devices to the determined number of groups allocates at least the minimum number of storage devices to each group.

46. The article of manufacture of claim 45, wherein each group comprises a Redundant Array of Independent Disk (RAID) rank and wherein the configuration level comprises a level number of the rank.

47. The article of manufacture of claim 35, wherein the group resource allocation variable comprises at least or variable that is member of the group of variables comprising:

a maximum number of storage devices used in a single group;

a maximum number of groups to which the selected number of storage devices may be assigned, and a minimum number of groups to which the selected number of storage devices may be assigned.

48. The article of manufacture of claim 35, wherein the resource allocation goal is a member of a set of resource allocation goals comprising:

providing an equal number of storage devices in each group;

ensuring that the groups have a sufficient number of storage devices to implement a requested RAID configuration;

minimizing the number of groups; and limiting the number of storage devices assigned to each group to improve cache utilization.

49. An article of manufacture include code for determining a configuration of a logical array including a plurality of storage devices, wherein the code is capable of causing operations comprising:

receiving a selection of a number of storage devices to include in the logical array;

determining a number of groups in which to include the selected number of storage device, wherein each group includes at least one storage device maintaining user data and parity data for the user data in the group, by:
(i) determining whether a number of groups can be selected to which the user selected number of storage devices can be equally allocated; and
(ii) providing information indicating that a same number of storage devices cannot be allocated to each group; and determining an assignment of the selected number of storage devices to the determined number of groups; and allocating the storage devices to the determined number of groups according to the determined assignment.

50. The article of manufacture of claim 49, further comprising:

after providing the information, receiving input information on additional storage devices to add to the logical array; and performing another iteration of determining the number of groups and the assignment in response to receiving the input information on the additional storage devices.

51. The article of manufacture of claim 49, further comprising:

after providing the information, receiving input information indicating acceptance of an unbalanced assignment of storage devices to groups, wherein the determined assignment provides a different number of storage devices to at least two of the groups after receiving the input information indicating acceptance of the unbalanced allocation.

* * * * *